Patented Oct. 27, 1942

2,299,786

UNITED STATES PATENT OFFICE 2,299,786

PROCESS OF TREATING TEXTILE MATERIALS

Albert Edward Battye, Joseph Tankard, and Frederick Charles Wood, Manchester, England, assignors to Tootal Broadhurst Lee Company, Limited, Manchester, England, a British company No Drawing. Application December 8, 1937, Serial No. 178,692. In Great Britain December 9, 1936

2 Claims. (Cl. 91—70)

This invention relates to the production of textile materials, whether fibres, yarns or fabrics, containing synthetic condensation products and has for its object to improve the wearing properties of such materials.

It is known that novel effects can be produced on textile materials by the presence of synthetic condensation products. By "synthetic condensation products" we mean the substances which are produced by treatment of the textile materials with a dispersion or solution of a synthetic resin, or with a solution of synthetic resin components, or with intermediate condensation products of such components, followed if required by subsequent treatment to cause chemical polymerisation or condensation to take place by virtue of the presence of a suitable polymerising or condensing agent, or by increased pressure. For example, crease-resisting materials may be produced as described in British patent specifications Nos. 291,473; 291,474; 304,900; 449,243; 413,328; 424,535; delustred textile materials as described in British patent specification No. 467,480; or stiffened materials by well known processes.

Since the condensation product is upon or within or upon and within the fibres or the yarns of the textile material such material may be said to contain the condensation product. The expression "containing condensation product" or similar phrase is therefore used herein without reference to the distribution of the condensation product which is associated with the textile material.

The object of the present invention is to improve the wearing properties of materials rendered crease-resistant, stiffened or delustred by the presence of synthetic condensation products. It has been found that this result is secured by treatment of the textile materials with rubber latex (natural or artificial) before, during or after treatment with the synthetic condensation products. Thus natural rubber latex or an artificial dispersion of rubber or of a rubber-like body may be added to a resin forming reaction mixture for the production of crease-resisting materials having improved wearing properties.

The expression "rubber material" when used herein includes natural or artificial rubber or rubber derivatives or synthetic materials of rubber-like character.

If it is desired to produce crease-resistance which will withstand washing by means of urea/formaldehyde or similar resinous condensation products, it is necessary to have acid present during the final hardening of the resin. The admixture of an acid solution however, will coagulate certain types of rubber latex (e. g. *Hevea Braziliensis*). It has been found that this difficulty may be overcome, (a) by the use of a delayed polymeriser or a potentially acid catalyst, e. g. as described in British patent specification No. 449,243; (b) by the use of acid catalyst together with compatible protective agents or anti-coagulants such as sulphonated fatty alcohols and their salts which prevent coagulation of the latex by the acid present.

The invention is particularly useful when using solutions producing urea/formaldehyde, thiourea/formaldehyde or urea/formaldehyde/alkali sulphide resins, but other resins can be employed, e. g. satisfactory results have been obtained with condensation products of formaldehyde with cyanamide, dicyandiamide, melamine, ammonium cyanate, phenol, cresol and derivatives thereof.

The following examples refer to urea/formaldehyde condensation products:

Example 1 uses a potentially acid catalyst in conjunction with natural latex (*Hevea brasiliensis*), to produce a crease-resisting fabric of improved wearing properties.

Example 2 uses a free acid and a protective agent with natural latex, to produce a crease-resisting fabric of improved wearing properties.

Example 3 uses a potentially acid catalyst in conjunction with an artificial latex, to produce a crease-resisting fabric of improved wearing properties, all three examples employing a low viscosity (short boil) reaction mixture.

Example 4 uses a free acid and a protective agent with natural latex, to produce a stiffened fabric of improved wearing properties employing a higher viscosity (long boil) reaction mixture.

Examples 5 and 6 use natural latex for the after-treatment of materials containing urea/formaldehyde condensation products, to produce crease-resisting fabric and a delustred fabric respectively both having improved wearing properties.

Example 1

An intermediate condensation product from urea and formaldehyde is prepared by known methods, e. g. heating 100 gms. urea and 200 ccs neutralised formaldehyde (40% solution) with 9 ccs. ammonia (S. G. 0.880) under reflux condenser for 3 minutes at the boil and then cooling or allowing 100 gms. urea to condense in the cold with 200 ccs. of neutralised or unneutralised formaldehyde solution (40%) for some hours until a viscosity of 5 to 7 centipoises (water=1) is obtained.

50 ccs. of this urea-formaldehyde condensation product is diluted with 48 ccs. water and 2 ccs. of a rubber latex (*Hevea brasiliensis*) added. To this mixture is added 1 to 2 gms. of triammonium phosphate, dissolved in a small quantity of water.

Textile material is impregnated with this solution, squeezed, dried at low temperature, and heated in a hot air chamber with or without steam for two to three minutes at 120–130° C.

Example 2

An intermediate condensation product is obtained as in Example 1.

To 50 ccs. of this product are added 17 ccs. of a 3% solution of a sulphonated fatty alcohol sodium salt, 2 ccs. of 60% latex (*Hevea brasiliensis*) and 1 to 3 ccs. of a 33% solution of tartaric acid, and the mixture made up to 100 ccs. with water. No coagulation of the latex occurs.

The textile material is impregnated with this solution, squeezed, dried at a low temperature (40 to 80° C.) and heated in a hot air chamber or over heated cylinders for a few minutes at 120 to 170° C.

Example 3

An artificial latex is prepared as follows: 10 gms. of chlorinated rubber dissolved in 50 ccs. benzene is added slowly and with constant shaking to a solution of 5 gms. of a sulphonated fatty alcohol salt in 50 ccs. of water, and the mixture passed through a suitable emulsifying machine.

To 20 ccs. of this artificial latex is added 50 ccs. of a resin intermediate product prepared as in Example 1, 30 ccs. water, and 1 to 2 gms. of di-ammonium tartrate.

Textile material is impregnated with this solution, squeezed, dried at low temperature (40 to 80° C.), and heated in a hot air chamber, with or without steam for 2 to 3 minutes at 170° C.

Example 4

150 gms. urea are mixed with 375 ccs. of a 40% formaldehyde solution and 15 gms. hexamine. This mixture is boiled under reflux until on cooling a sample drawn off, no turbidity occurs.

20 ccs. of this viscous product is mixed with 10 ccs. of a 60% rubber latex (*Hevea brasiliensis*), 15 ccs. of a 3% aqueous solution of a sulphonated fatty alcohol salt, and the whole made up to 80 ccs. with water. Then the catalyst, 0.6 gm. tartaric acid dissolved in 1.2 ccs. water is added.

Textile material is impregnated with the mixture, squeezed between rollers, dried at 40 to 80° C., and finally subjected to a heat treatment up to 170° C. for 2 minutes.

Example 5

A crease-resisting linen fabric is prepared by the process described in British patent specification No. 437,361, and then immersed in a rubber latex dispersion made by diluting 2 ccs. of a 60% latex (*Hevea brasiliensis*) with water to 100 ccs. The fabric is then dried or dried and heated.

Example 6

A fabric of viscose rayon is treated so as to contain a methylene urea by the process disclosed in British patent specification No. 467,480. It is then treated in a latex dispersion as described in Example 5.

The fabric is then dried or dried and heated.

Instead of employing two successive operations, the process of this example may be carried out in one bath by mixing a protective agent with the latex, as described above, and adding, for example, urea and formaldehyde and acid in the proportions described in British patent specification No. 467,480. The cloth is then immersed in the mixture and the delustring allowed to take place.

We declare that what we claim is:

1. Process for producing textile material of improved wearing quality which includes the step of impregnating said material with an aqueous dispersion of rubber containing synthetic urea-formaldehyde resin components and a catalyst capable of liberating acid together with an agent capable of preventing coagulation of the dispersion by said acid.

2. Process as in claim 1 in which the agent capable of preventing coagulation is a latex-anticoagulant.

ALBERT EDWARD BATTYE.
JOSEPH TANKARD.
FREDERICK CHARLES WOOD.